Nov. 6, 1923.
R. D. MERSHON
1,473,243
MEANS FOR MAINTAINING EBULLITION
Filed July 20, 1921  2 Sheets-Sheet 1
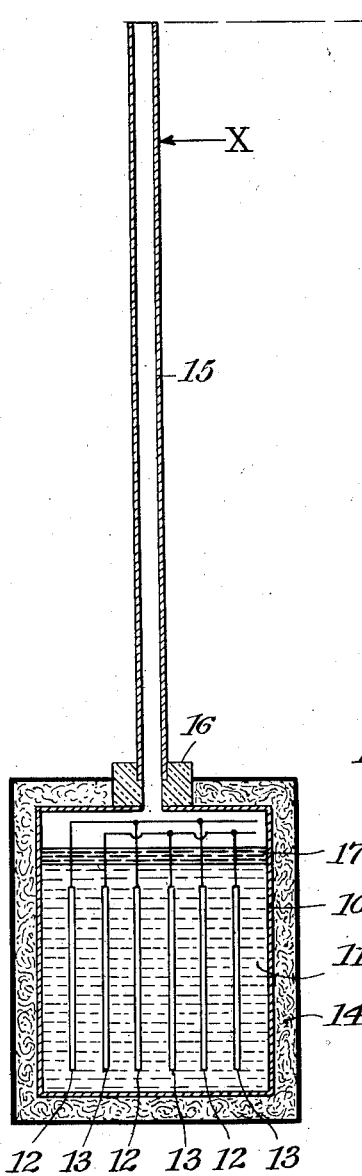
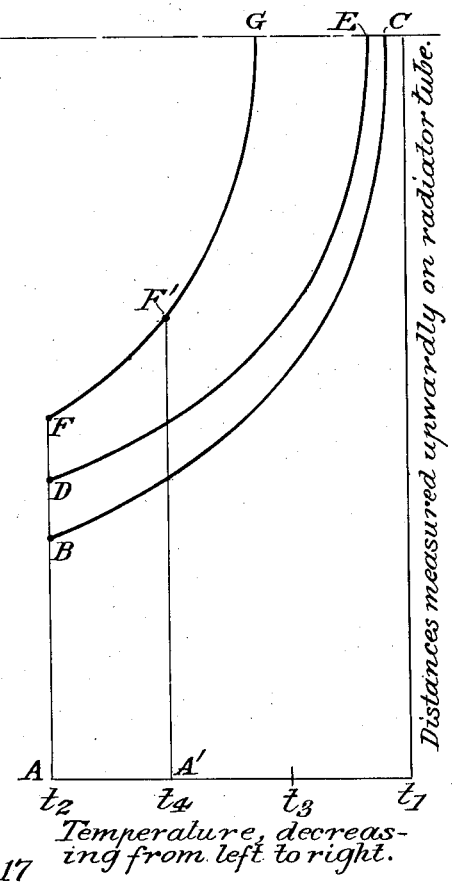

Nov. 6, 1923.

R. D. MERSHON 1,473,243

MEANS FOR MAINTAINING EBULLITION

Filed July 20, 1921   2 Sheets-Sheet 2

R. D. Mershon
INVENTOR

BY
Kerr, Page, Cooper & Hayward
ATTORNEY

Patented Nov. 6, 1923.

1,473,243

UNITED STATES PATENT OFFICE.

RALPH D. MERSHON, OF NEW YORK, N. Y.

MEANS FOR MAINTAINING EBULLITION.

Application filed July 20, 1921. Serial No. 486,250.

*To all whom it may concern:*

Be it known that I, RALPH D. MERSHON, a citizen of the United States of America, residing at New York, in the county and State of New York, have invented certain new and useful Improvements in Means for Maintaining Ebullition, of which the following is a full, clear, and exact description.

In various arts instances are found in which it is desirable to keep a liquid boiling in order to maintain an effective circulation in all parts, especially in those parts which may tend to become hottest. For example, a liquid being evaporated by boiling may be burned or charred in portions of the container not easily reached by mechanical means of stirring. Or it may be desirable to maintain such circulation in a liquid immersing a device whose normal operation causes the liberation of heat. One instance of this class is the electrolytic condenser. In such apparatus it is usually desirable, and in some cases essential, to keep up an effective circulation in all portions of the electrolyte, especially in the folds or corrugations of the active electrodes or "anodes", where adequate movement of the liquid is difficult to maintain by mechanical means. And it is at the immediate surface of the anodes that the temperature of the electrolyte is most likely to be highest.

It might be thought that simple thermostatic control of the source of heat, or of the radiating or cooling surface in cases where the liberation of heat accompanies the operation of the apparatus, as in the electrolytic condenser, would be sufficient to maintain the desired ebullition; but more careful consideration will make it plain that the problem is not so easy of solution as that. For example, it will be noted that a thermostat is responsive to temperature-variation only, whereas the boiling temperature of a liquid depends upon pressure. Hence if the pressure in the container should rise, the temperature maintained by the thermostat would not be sufficient to cause ebullition. In short, the thermostat would be suitable for only one pressure, and a very small variation from such pressure would entirely destroy its effectiveness as a means for maintaining ebullition. Moreover, ebullition depends not only upon temperature but also upon rapidity of evaporation. A liquid "simmering" or boiling quietly has the same temperature (other conditions being the same) as when boiling vigorously, whereas the former may be wholly inadequate to produce the desired or necessary circulation or agitation of the liquid.

It will therefore be seen that it is important for the controlling apparatus to take account not only of temperature but also of the rate of vapor liberation. Accordingly it is upon this principle that my present invention is based, my object being to provide means for maintaining ebullition which is responsive both to temperature and to the rate of vapor-liberation. To this and other ends the invention consists in the novel features and combinations hereinafter described.

Referring to the accompanying drawing,

Fig. 1 illustrates in vertical section a piece of apparatus composed of a heat-insulated vessel provided with a long vapor-escape tube. This apparatus is referred to hereinafter in explaining the principle of my invention.

Fig. 2 is a diagram indicating the effect upon the temperature in different parts of the vapor-escape tube in Fig. 1, of varying rates of vapor liberation.

Figure 3:
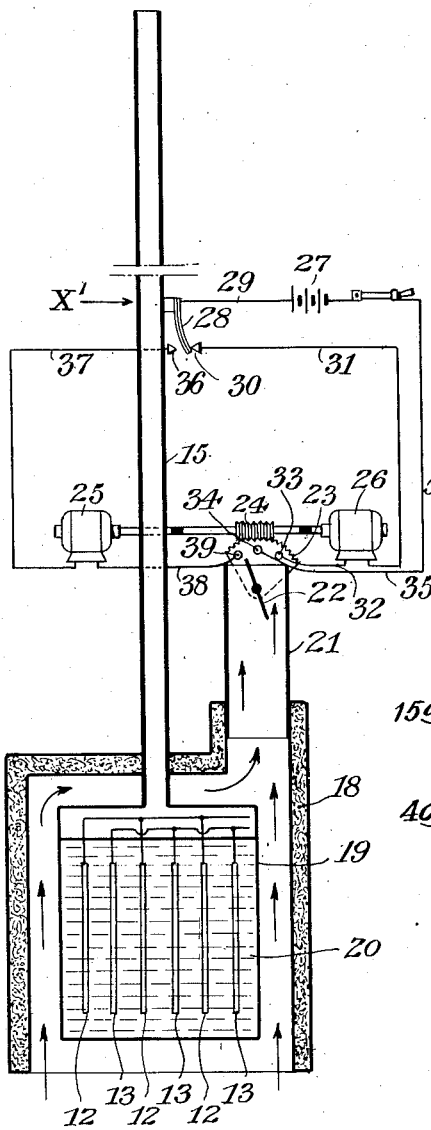
Fig. 3 is a view, partly in section, illustrating diagrammatically one form of my invention.

Referring to Fig. 1, 10 represents a vessel containing a liquid 11 which is to be kept in ebullition, by heat imparted to it from, say, an interior heating coil, not shown; or the liquid may be the electrolyte of a condenser, immersing the electrodes which are indicated at 12, 13. The vessel has a heat-insulating jacket, 14, and is provided with a long upright vapor-escape tube 15, preferably of metal, open at the top to the air and at the bottom heat-insulated from the vessel by any suitable means, as for example a porcelain collar 16. On the surface of the liquid 11 is a layer of oil 17, so that at temperatures below boiling there will be practically no evaporation from the surface. For the sake of clearness the thickness or depth of the oil layer is exaggerated in the figure. The purpose of the oil is to prevent surface evaporation of the liquid and consequent loss of heat. It is assumed that the heat-insulation of the apparatus is virtually perfect, so that only such heat can be lost as radiates from the surface of the oil into the pipe and such as is carried into the pipe by the vapor liberated in boiling. It follows, therefore, that if heat is imparted to the liquid at a rate faster than the rate of loss the liquid will eventually boil, and will continue to boil if the heat-input is at least equal to the heat loss; and this will happen regardless of the temperature and pressure of the air or other surrounding medium into which the outlet tube opens. It is assumed, however, that the temperature of this medium is less than the boiling temperature of the liquid.

As the liquid boils, the vapor liberated, rises in the tube, loses its heat to the tube wall and thence to the atmosphere, and the resulting liquid runs back into the vessel. The tube thus constitutes a condenser and a radiator.

We now consider the temperature distribution along the radiator and condenser, 15. Suppose the temperature of the medium (in the present case the air) into which the radiator opens to be $t_1$, and its pressure $p_1$, and that the temperature at which the liquid boils under pressure $p_1$ to be $t_2$. Suppose also that heat is supplied to the liquid at a rate $h_1$. As soon as the temperature $t_2$ is reached the liquid will begin to boil and the temperature will thereafter remain stationary. The vapor from the liquid will rise in the radiator and will raise the temperature of its wall to about the value $t_2$, and the radiator will give up heat to the air. Farther up the tube a point will be reached where so little of the vapor is left uncondensed that the temperature of the tube walls will begin to fall off; the location of this point being evidently dependent, other conditions remaining the same, upon the rate at which the vapor is liberated. We now take the temperatures at suitable distances on the radiator, measured upwardly, and plotting these temperatures against the distances we get a curve such as ABC, Fig. 2. The precise form of the curve is immaterial. It will depend upon a number of factors, such as the thickness and conductivity of the radiator walls, the latent heat of the vapor, the rate at which the surrounding medium will absorb heat, etc. But the general form, as indicating the temperature distribution generally, is substantially as shown. In this figure, distances up the radiator 15 (Fig. 1) are laid off on the vertical line at the right and the corresponding temperatures (decreasing) are laid off from left to right on the horizontal line. At boiling temperature $t_2$ and pressure $p_1$, and an outside temperature $t_1$, the temperature of the radiator tube 15 is approximately $t_2$ up to about the point B, and in this space the major portion of the vapor is condensed. Above the point B the temperature of the radiator falls off, and at its upper end its temperature may be slightly above that of the surrounding medium. Evidently, the longer the radiator the nearer will its terminal temperature approach the outside temperature.

Suppose, now, that the rate of heat input is increased, say from $h_1$ to $h_2$. Then the rate at which vapor is given off will increase in approximate proportion, and the vapor (thus increased in amount) will reach out for more condensing surface, to the point D, for instance, and we shall then have a temperature-distribution curve like ADE. In short the distribution of temperature along the radiator depends upon the rate of vapor liberation, and depends entirely upon this rate if other conditions remain the same.

Reverting to the first conditions, that is, boiling temperature $t_2$, temperature of surrounding medium $t_1$, and rate of heat-supply $h_1$, suppose that the temperature of the surrounding medium be $t_3$, lying one-third the distance from $t_1$ to $t_2$. The temperature difference between the vapor and the air is now only two-thirds of what it was before and hence a given length of radiator surface will be only about two-thirds as effective as before. It will therefore require approximately three-halves as much radiator surface to condense the major portion of the vapor, and accordingly the distribution curve will be about like AFG in which AF=AB (3/2).

Similarly, we may suppose that the pressure of the surrounding medium is reduced until the boiling temperature becomes $t_4$, lying one-third of the distance from A to $t_1$ on the diagram. In this case if the temperature of the air be $t_1$ the curve will be like A′F′G. On the other hand, if the temperature of the air be $t_3$, lying two-thirds of the distance from $t_2$ to $t_1$, the length of radiator surface required to condense the major portion of the vapor will be three times the length AB, or the full length of the tube.

Assuming the maximum pressure and temperature that the surrounding medium can have, and the maximum amount of heat to be dissipated by the boiling, we can by design or experiment, determine the corresponding radiator temperature at a convenient point, say X. If then, by controlling the amount of radiating surface, or its effectiveness, or the rate of heat input, or any two or more of these factors, we keep the temperature of the radiator at the point X at or above the temperature which it would have under the extreme conditions referred to, the liquid in the vessel will always be boiling. The temperature at X, depends, as has been shown, upon the rate of vapor liberation, in part at least, and we may select, as the temperature to be maintained at X, a higher temperature (as much higher as we wish) than what would be the temperature there under the extreme conditions mentioned. In such case the thermostatic devices employed to maintain the selected temperature will have all necessary latitude for error due to imperfect operation or other causes.

The use of oil on the liquid to be boiled, and the use of heat-insulation between the vessel and the radiator tube, are not usually necessary in practise, and in what follows they are assumed to be omitted; but it is to be understood that they can be employed wherever their results are necessary or desirable.

In Fig. 3 I have illustrated diagrammatically a simple method of maintaining at a selected point X' in the radiator 15, a temperature sufficiently high to insure boiling. In the apparatus shown, the insulating jacket 18 is open at the bottom and spaced from the vessel 19 (containing the electrolyte 20, which is to be kept boiling, and the electrodes 12, 13), and is provided with an outlet 21 controlled by a valve 22 which is turned by a sector 23 and worm 24. The latter is rotated by one or the other of two motors 25, 26, in parallel with each other but in series with a source of current 27 and with a thermostatic circuit-controller 28 so associated with the radiator 15 as to be responsive to temperature variation at the selected point X'. In the figure the wide open valve 22 has allowed so rapid a flow of air around vessel 19 that the boiling of the liquid therein has been reduced to such an extent that the rate of vapor liberation is not sufficient to keep the point X' at the selected temperature, and the thermostat has therefore flexed to the right, closing a circuit from battery 27 through wire 29, thermostat 28, contact 30, wire 31, motor 26, wire 32, contact 33, sector 23, contact 34, and wire 35 back to the battery, 27. Motor 26 now starts, and rotates worm 24 in such direction as to swing the sector 23 counterclockwise, thereby closing valve 22 more and more and permitting less and less air to flow around the vessel 19. The rate of heat-loss is thus diminished and the rate of vapor liberation increases in consequence, until the temperature at X' rises enough to flex the thermostat out of engagement with contact 30, whereupon the motor 26 ceases to run and the valve 22 is left in its adjusted position. If, now, the rate of vapor liberation increases enough to raise the temperature at X' above the limit permitted by the thermostat the opposite flexure of the latter will close a circuit from battery 27 through wire 29, thermostat 28, contact 36, wire 37, motor 25, wire 38, contact 39, sector 23, contact 34, and wire 35 back to the battery 27. Motor 25 then rotates the worm in the opposite direction and opens the valve 22. In either case, if the sector is swung beyond its predetermined limit of movement without the thermostat being sufficiently affected to break the circuit, the sector will itself break the circuit by swinging past contact 33 or 39, according to which motor is operating. Reverse flexure of the thermostat can then start the other motor when the abnormal conditions have been remedied.

Figure 4:
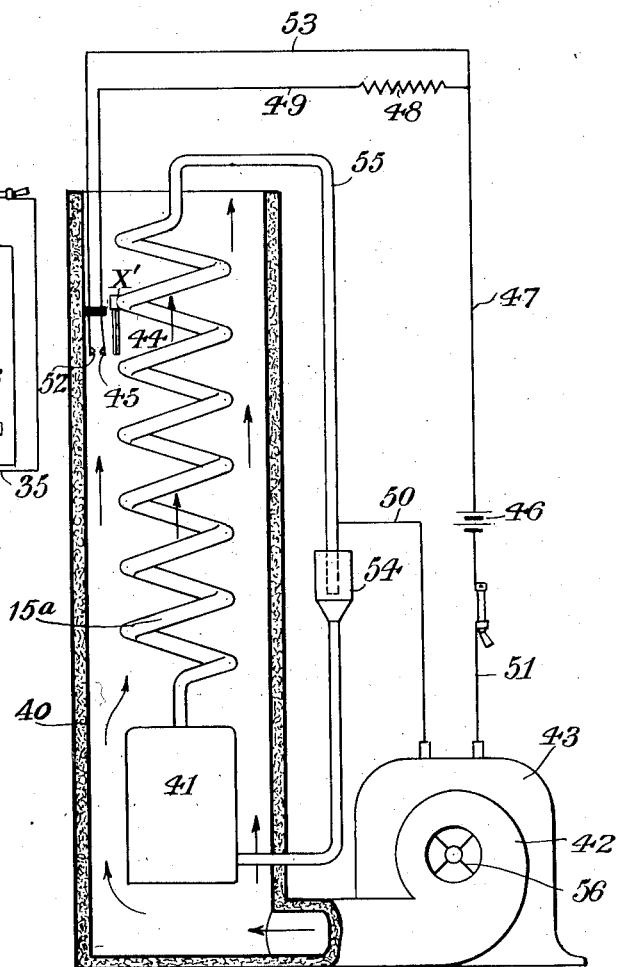
Fig. 4 is a similar view of another form.

In Fig. 3 the controlling devices do not affect the extent or effectiveness of the radiator surface 15. In Fig. 4, however, the air for absorbing the heat is propelled through the insulating jacket 40, around the electrolytic condenser 41 and around the radiator 15$^a$ as well, by a blower 42 driven by a motor 43. As the rate of vapor liberation in 41 increases, the thermostat 44 flexes toward the left, and when it impinges on contact 45 it establishes a circuit from source 46, wire 47, resistance 48, wire 49, contact 45, thermostat 44, radiator 15$^a$, wire 50, motor 43, and wire 51 back to the battery 46. The motor now drives the fan or blower at low speed. If the rate of vapor-liberation is still too high, the continued flexure of the thermostat may bring contact 45 over upon contact 52, thereby laying a shunt 53 around the resistance 48 and causing the motor to speed up. As the rate of vapor-liberation decreases the temperature at X' falls, and the thermostat flexes in the opposite direction, far enough to slow down the motor by breaking the shunt, and even to stop the motor if necessary.

Fig. 4 also illustrates lengthening the radiator tube by coiling it, and bringing it down to an open funnel 54 to return to the vessel 41 any liquid condensed beyond the bend 55. The air-impelling device 42 is shown as a centrifugal blower, which is a convenient type, ordinarily suitable for the purpose, but if the natural draft through the air-intake opening (as 56) is objectionable a blower of the pump or other type may be used. Such blowers are well understood and hence it is deemed unnecessary to illustrate the same.

In the embodiments illustrated in Figs. 3 and 4 the heat which causes the ebullition is a by-product, so to speak, of the operation of the electrolytic condenser, and hence thermostatic control of the liberation of heat would involve complications which, in general, make it preferable to control the extent of the cooling surface, or its effectiveness, etc. On the other hand, with apparatus in which heat-supplying means are provided, as an electrical resistance, or a steam coil, for instance, thermostatic control of the heat source is in many cases desirable. Thus in Fig. 3 the motors 25, 26, worm 24 and sector 23 may operate the steam-inlet valve of a heating coil (not shown) or may swing a switch arm over the points of a heating resistance (not shown), as will be readily understood. In such cases the cooling surface would usually be made as small and ineffective as possible, in order to conserve heat, and the radiator tube would be allowed to radiate as little heat as possible consistently with its function as part of the controlling apparatus.

It is to be understood that the invention is not limited to the specific constructions herein illustrated and described but can be embodied in other forms without departure from its spirit.

I claim:

1. The combination with a vessel adapted to contain a liquid, of automatic means for maintaining a substantially constant temperature in the liquid, at least in part dependent for operation upon the rate of vapor-liberation from the liquid.

2. The combination with a vessel adapted to contain a liquid, of automatic means for maintaining in the liquid a temperature of substantially constant effectiveness in producing evaporation of the liquid, said means including temperature-responsive apparatus and means for subjecting such apparatus to temperature which is at least in part dependent upon the rate of evaporation from the liquid.

3. The combination with a vessel adapted to contain a liquid, of automatic means dependent for operation upon the temperature of the vapor liberated from the liquid and its rate of liberation to maintain the liquid in a state of ebullition.

4. The combination with a vessel adapted to contain a liquid, and a heat-radiating device connected with the vessel to receive vapor from the liquid, of means for maintaining in the liquid a temperature of substantially constant effectiveness in producing evaporation, said means including thermostatic apparatus responsive to the temperature of a selected part of the heat-radiating device.

5. The combination with a vessel adapted to contain a liquid and having cooling surface, of means at least in part dependent for operation upon the rate of vapor-liberation from the liquid to control the loss of heat from said surface.

6. The combination with an electrolytic condenser comprising a vessel, an electrolyte therein, and a plurality of electrodes immersed in the electrolyte, of means dependent at least in part upon the rate of vapor-liberation from the electrolyte to maintain the latter in a state of ebullition.

In testimony whereof I hereto affix my signature.

RALPH D. MERSHON.